United States Patent
Ishizuka

(10) Patent No.: US 9,832,114 B2
(45) Date of Patent: Nov. 28, 2017

(54) PACKET FORWARDING SYSTEM, CONTROL APPARATUS, PACKET FORWARDING METHOD, AND PROGRAM

(71) Applicant: NEC CORPORATION, Tokyo (JP)

(72) Inventor: Eiichi Ishizuka, Tokyo (JP)

(73) Assignee: NEC Corporation, Tokyo (JP)

( * ) Notice: Subject to any disclaimer, the term of this patent is extended or adjusted under 35 U.S.C. 154(b) by 81 days.

(21) Appl. No.: 14/399,158

(22) PCT Filed: May 24, 2013

(86) PCT No.: PCT/JP2013/064505
§ 371 (c)(1),
(2) Date: Nov. 5, 2014

(87) PCT Pub. No.: WO2013/176262
PCT Pub. Date: Nov. 28, 2013

(65) Prior Publication Data
US 2015/0110107 A1    Apr. 23, 2015

(30) Foreign Application Priority Data
May 25, 2012    (JP) .................................. 2012-119534

(51) Int. Cl.
*H04L 12/723*    (2013.01)
*H04L 12/761*    (2013.01)
(Continued)

(52) U.S. Cl.
CPC .............. *H04L 45/50* (2013.01); *H04L 45/16* (2013.01); *H04L 45/245* (2013.01); *H04L 45/72* (2013.01);
(Continued)

(58) Field of Classification Search
CPC ......... H04L 45/12; H04L 45/16; H04L 45/50; H04L 45/72; H04L 45/245; H04L 45/42; H04L 45/64; H04L 49/10; Y02B 60/33
See application file for complete search history.

(56) References Cited

U.S. PATENT DOCUMENTS 7,613,201 B1    11/2009  Yang et al.
8,270,290 B2     9/2012  Casey et al.
(Continued)

FOREIGN PATENT DOCUMENTS

JP          2000-270002 A    9/2000
WO     WO 2008/095010 A     8/2008
(Continued)

OTHER PUBLICATIONS

International Search Report (ISR) (PCT Form PCT/ISA/210), in PCT/JP2013/064505, dated Jul. 16, 2013.
(Continued)

*Primary Examiner* — Khoa Huynh
(74) *Attorney, Agent, or Firm* — McGinn IP Law Group, PLLC

(57) ABSTRACT

A packet forwarding system includes: a plurality of first relay apparatuses connected to one another; a plurality of second relay apparatuses that include a plurality of ports and that are connected to the plurality of first relay apparatuses; and a control apparatus that configures a plurality of trunks, each serving as a virtual logical link, by using a plurality of physical links between the first relay apparatuses and the second relay apparatuses. The control apparatus determines a designated port for each of the plurality of trunks from among constituent ports of the each trunk. When one of the plurality of first relay apparatuses receives a predetermined control target packet from one of the plurality of second relay apparatuses, the control apparatus causes the plurality of first relay apparatuses to transmit the predetermined
(Continued)

control target packet via a first relay apparatus including a designated port for one of the plurality of trunks, to which a port of the one first relay apparatus receiving the predetermined control target packet belongs.

14 Claims, 12 Drawing Sheets

(51) Int. Cl.
*H04L 12/709* (2013.01)
*H04L 12/721* (2013.01)
*H04L 12/715* (2013.01)
*H04L 12/717* (2013.01)

(52) U.S. Cl.
CPC .............. *H04L 45/42* (2013.01); *H04L 45/64* (2013.01); *Y02B 60/33* (2013.01)

(56) References Cited

U.S. PATENT DOCUMENTS

| | | | |
|---|---|---|---|
| 8,462,774 | B2 | 6/2013 | Page et al. |
| 8,488,608 | B2 | 7/2013 | Mohandas et al. |
| 8,767,735 | B2 | 7/2014 | Jacob Da Silva et al. |
| 8,804,733 | B1* | 8/2014 | Safrai .................... H04L 49/10 370/392 |
| 8,861,335 | B2 | 10/2014 | Casey et al. |
| 2008/0189769 | A1 | 8/2008 | Casado et al. |
| 2010/0157844 | A1 | 6/2010 | Casey et al. |
| 2011/0317701 | A1* | 12/2011 | Yamato .................. H04L 49/25 370/392 |
| 2012/0033541 | A1 | 2/2012 | Jacob Da Silva et al. |
| 2012/0033665 | A1 | 2/2012 | Jacob Da Silva et al. |
| 2012/0033669 | A1 | 2/2012 | Mohandas et al. |
| 2012/0033672 | A1 | 2/2012 | Page et al. |
| 2013/0058349 | A1* | 3/2013 | Khalil .................... H04L 45/12 370/400 |
| 2013/0195110 | A1 | 8/2013 | Kojima |
| 2013/0215749 | A1 | 8/2013 | Casey et al. |
| 2013/0318243 | A1* | 11/2013 | Chinthalapati ......... H04L 45/52 709/226 |
| 2014/0177433 | A1 | 6/2014 | Casey et al. |

FOREIGN PATENT DOCUMENTS

| | | |
|---|---|---|
| WO | WO 2010/069041 A1 | 6/2010 |
| WO | WO 2012/018521 A1 | 2/2012 |
| WO | WO 2012/050071 A1 | 4/2012 |

OTHER PUBLICATIONS

Nick McKeown, and seven others, "OpenFlow: Enabling Innovation in Campus Networks," [online], [searched May 8, 2012], Internet <URL:http://www.openflow.org/documents/openflow-wp-latest.pd>.

"OpenFlow Switch Specification" Version 1.1.0 Implemented (Wire Protocol 0x02), [online], [searched on May 8, 2012], Internet <URL:http://www.openflow.org/documents/openflow-spec-v1.1.0.pdf>.

Extended European Search Report dated Dec. 9, 2015.

Chinese Office Action dated Oct. 10, 2016 with an English translation thereof.

* cited by examiner

FIG. 3

| STACK LINK ID | RELAY APPARATUS | EAST STACK LINK PORT | WEST STACK LINK PORT |
|---|---|---|---|
| S001 | 101 | #3 | #4 |
| | 102 | #3 | #4 |
| | 103 | #3 | #4 |

FIG. 4

| TRUNK ID | STACK LINK ID | RELAY APPARATUS | MEMBER PORT |
|---|---|---|---|
| T001 | S001 | 101 | #1 |
| | | 102 | #1 |
| | | 103 | #1 |
| T002 | S001 | 101 | #2 |
| | | 102 | #2 |
| | | 103 | #2 |

FIG. 6

| Matching conditions | | | Processing contents (Instructions) |
|---|---|---|---|
| In Port | | MPLS label | |
| Designated port | | ANY | Forward packet from port connected to next-hop relay APPARATUS on BC forwarding path |
| Member port | | ANY | Encapsulate packet with MPLS, set trunk ID of trunk to which member port belongs in MPLS label, and forward packet from EAST stack link port |
| EAST stack link port | Same as trunk ID associated with designated port | | Decapsulate and forward packet from port connected to next-hop relay APPARATUS on BC forwarding path |
| | Different from trunk ID associated with designated port | | Forward packet from WEST stack link port |
| WEST stack link port | Same as trunk ID associated with designated port | | Decapsulate and forward packet from port connected to next-hop relay APPARATUS on BC forwarding path |
| | Different from trunk ID associated with designated port | | Forward packet from EAST stack link port |

FIG. 7

| Matching conditions | | Processing contents (Instructions) |
|---|---|---|
| In Port | Member port | Encapsulate packet with MPLS, set trunk ID of trunk to which member port belongs in MPLS label, and forward packet from EAST stack link port |
| | EAST stack link port | Forward packet from WEST stack link port |
| | WEST stack link port | Forward packet from EAST stack link port |

PACKET FORWARDING SYSTEM, CONTROL APPARATUS, PACKET FORWARDING METHOD, AND PROGRAM

REFERENCE TO RELATED APPLICATION

The present invention is based upon and claims the benefit of the priority of Japanese patent application No. 2012-119534, filed on May 25, 2012, the disclosure of which is incorporated herein in its entirety by reference thereto.

TECHNICAL FIELD

The present invention relates to a packet forwarding system, a control apparatus, a packet forwarding method, and a program. In particular, it relates to: a packet forwarding system in which trunks serving as virtual logical links are configured by using a plurality of physical links; a control apparatus; a packet forwarding method; and a program.

BACKGROUND

In recent years, a technique referred to as OpenFlow has been proposed (see Patent Literature (PTL) 1 and Non-Patent Literatures (NPLs) 1 and 2). OpenFlow recognizes communications as end-to-end flows and performs path control, failure recovery, load balancing, and optimization on a per-flow basis. Each OpenFlow switch according to Non-Patent Literature 2 has a secure channel for communication with an OpenFlow controller and operates according to a flow table suitably added or rewritten by the OpenFlow controller. In the flow table, a set of the following three is defined for each flow: matching rules (Header Fields) against which a packet header is matched; flow statistical information (Counters); and Instructions that define a processing content(s) (see FIG. 10).

For example, when an OpenFlow switch receives a packet, the OpenFlow switch searches the flow table for an entry having a matching rule (see Header Fields in FIG. 10) that matches header information of the received packet. If, as a result of the search, the OpenFlow switch finds an entry matching the received packet, the OpenFlow switch updates the flow statistical information (Counters) and processes the received packet on the basis of a processing content(s) (packet transmission from a specified port, flooding, dropping, etc.) written in the Instructions field of the entry. If, as a result of the search, the OpenFlow switch does not find an entry matching the received packet, the OpenFlow switch transmits an entry setting request to the OpenFlow controller via the secure channel. Namely, the OpenFlow switch requests the OpenFlow controller to determine a processing content for the received packet. The OpenFlow switch receives a flow entry defining a processing content(s) and updates the flow table. In this way, by using an entry stored in the flow table as a processing rule (packet processing instruction), the OpenFlow switch performs packet forwarding.

To realize broadcast or multicast in networks disclosed in the above Patent Literature 1 and Non-Patent Literatures 1 and 2, flow entries for forwarding packets via a plurality of ports are set in each of the relevant OpenFlow switches.

In addition, Patent Literature 2 discloses a LAN relay apparatus that performs, when an uplink or a stack link reaches a congestion state, flow control without stopping input and output via input and output ports and without affecting communication that is irrelevant to the congestion state.

PTL 1:
International Publication No. 2008/095010
PTL 2:
Japanese Patent Kokai Publication No. 2000-270002A
NPL 1:
Nick McKeown, and seven others, "OpenFlow: Enabling Innovation in Campus Networks," [online], [searched May 8, 2012], Internet <URL:http://www.openflow.org/documents/openflow-wp-latest.pd>
NPL 2:
"OpenFlow Switch Specification" Version 1.1.0 Implemented (Wire Protocol 0x02), [online], [searched on May 8, 2012], Internet <URL:http://www.openflow.org/documents/openflow-spec-v1.1.0.pdf>

SUMMARY

The following analysis has been given by the present inventor. For example, if an OpenFlow switch is added to a network disclosed in the above Patent Literature 1, Non-Patent Literature 1, or Non-Patent Literature 2, ex-post facto changes may be caused in the network topology. OpenFlow switches do not transmit a flow entry setting request to the OpenFlow controller if these switches have a flow entry that matches a received packet in their own flow table. Consequently, if the network topology is changed, broadcast packets may not be forwarded to the newly-added OpenFlow switch or OpenFlow switches whose connection has been changed.

Thus, regarding forwarding of broadcast packets, it is desirable that broadcast distribution paths be calculated when the network topology is changed and that broadcast packet flow entries be previously set in the OpenFlow switches on each of the paths.

By using the techniques disclosed in the above Patent Literature 1 and Non-Patent Literatures 1 and 2 and setting appropriate flow entries (for example, for forwarding specific packets to the same destination) in some OpenFlow switches having parallel links, these links can be aggregated to configure a trunk that serves as a virtual logical link.

However, there are cases in which an apparatus that is located at an end of the above trunk is a communication apparatus that is not under control of an OpenFlow controller. In such cases, since each OpenFlow switch forwards broadcast packets in accordance with its own flow entries stored therein, the same packet could be transmitted to a certain destination a plurality of times. In addition, even if none of the broadcast packet flow entries are set, broadcast packets could be forwarded on unintended paths by other flow entries.

FIG. 11 illustrates a network configuration (a reference example) in which an apparatus that is located at an end of the above trunk is a communication apparatus that is not under control of an OpenFlow controller. The configuration illustrated in FIG. 11 includes relay apparatuses 101 to 105. The relay apparatuses 101 to 103 have constituent ports of a trunk T1 configured by an external relay apparatus 301 and the relay apparatuses 101 to 103 and configure a ring-type stack link. A control apparatus 200 determines a designated port from among the constituent ports of the trunk (for example, a port #1 of the relay apparatus 101) and controls the relay apparatuses 101 to 103 so that, when any one of the relay apparatuses 101 to 103 receives a predetermined control target packet, the received control target packet is transmitted via a relay apparatus having the designated port. In this way, transmission of a broadcast packet to the same destination a plurality of times can be prevented.

However, if a plurality of trunks are configured with a plurality of external relay apparatuses in the configuration illustrated in FIG. 11, a plurality of stack links are needed as illustrated in FIG. 12, the number of stack links depending on the number of trunks configured between the first relay apparatuses and the external relay apparatuses. In this case, each of the relay apparatuses configuring the stack links needs physical ports twice the number of stack links to use. Namely, the physical ports of each relay apparatus may not be used effectively. For example, in FIG. 12, a total of two trunks T1, T2 are configured between the relay apparatuses 101 to 103 and the external relay apparatus 301 and between the relay apparatuses 101 to 103 and an external relay apparatus 302. A stack link used for the trunk T1 configured between the relay apparatuses 101 to 103 and the external relay apparatus 301 uses ports #3 and #4 of each of the relay apparatuses 101 to 103, and a stack link used for the trunk T2 configured between the relay apparatuses 101 to 103 and the external relay apparatus 302 uses ports #5 and #6 of each of the relay apparatuses 101 to 103. If more external relay apparatuses are added and more trunks are configured, two more additional physical ports need to be arranged per added stack link to each of the relay apparatuses 101 to 103.

Therefore, there is a need in the art to forward broadcast packets by efficiently using physical ports of relay apparatuses included in a stack link even if a plurality of trunks are configured between relay apparatuses in a centralized-control-type network as typified by OpenFlow and external relay apparatuses.

According to a first aspect, there is provided a packet forwarding system, comprising: a plurality of first relay apparatuses connected to one another; a plurality of second relay apparatuses that include a plurality of ports and that are connected to the plurality of first relay apparatuses; and a control apparatus that configures a plurality of trunks, each serving as a virtual logical link, by using a plurality of physical links between the first relay apparatuses and the second relay apparatuses. The control apparatus determines a designated port for each of the plurality of trunks from among constituent ports of the each trunk. When one of the plurality of first relay apparatuses receives a predetermined control target packet from one of the plurality of second relay apparatuses, the control apparatus causes the plurality of first relay apparatuses to transmit the predetermined control target packet via a first relay apparatus including a designated port for one of the plurality of trunks, to which a port of the one first relay apparatus receiving the predetermined control target packet belongs.

According to a second aspect, there is provided a control apparatus that configures a plurality of trunks, each serving as a virtual logical link, by using a plurality of physical links between a plurality of first relay apparatuses connected to one another and a plurality of second relay apparatuses that include a plurality of ports and that are connected to the plurality of first relay apparatuses. The control apparatus determines a designated port for each of the plurality of trunks from among constituent ports of the each trunk. When one of the plurality of first relay apparatuses receives a predetermined control target packet from one of the plurality of second relay apparatuses, the control apparatus causes the plurality of first relay apparatuses to transmit the predetermined control target packet via a first relay apparatus including a designated port for one of the plurality of trunks, to which a port of the one first relay apparatus receiving the control target packet belongs.

According to a third aspect, there is provided a packet forwarding method performed by a control apparatus that configures a plurality of trunks, each serving as a virtual logical link, by using a plurality of physical links between a plurality of first relay apparatuses connected to one another and a plurality of second relay apparatuses that include a plurality of ports and that are connected to the plurality of first relay apparatuses. The packet forwarding method comprises: determining a designated port for each of the plurality of trunks from among constituent ports of the each trunk; and when one of the plurality of first relay apparatuses receives a predetermined control target packet from one of the plurality of second relay apparatuses, causing the plurality of first relay apparatuses to transmit the predetermined control target packet via a first relay apparatus including a designated port for one of the plurality of trunks, to which a port of the one first relay apparatus receiving the control target packet belongs. This method is associated with a certain machine, namely, with the control apparatus controlling the group of first relay apparatuses.

According to a fourth aspect, there is provided a program, causing a computer, on a control apparatus that configures a plurality of trunks, each serving as a virtual logical link, by using a plurality of physical links between a plurality of first relay apparatuses connected to one another and a plurality of second relay apparatuses that include a plurality of ports and that are connected to the plurality of first relay apparatuses, to execute: determining a designated port for each of the plurality of trunks from among constituent ports of the each trunk; and when one of the plurality of first relay apparatuses receives a predetermined control target packet from one of the plurality of second relay apparatuses, causing the plurality of first relay apparatuses to transmit the predetermined control target packet via a first relay apparatus including a designated port for one of the plurality of trunks, to which a port of the one first relay apparatus receiving the control target packet belongs. This program can be recorded in a computer-readable (non-transient) storage medium. Namely, the present invention can be embodied as a computer program product.

According to the present invention, broadcast packets can be forwarded by efficiently using physical ports of relay apparatuses included in a stack link even if a plurality of trunks are configured between relay apparatuses in a centralized-control-type network as typified by OpenFlow and external relay apparatuses.

BRIEF DESCRIPTION OF THE DRAWINGS

FIG. 3 illustrates stack link configuration information stored in a trunk information management unit in the control apparatus according to the first exemplary embodiment of the present invention.

FIG. 4 illustrates trunk configuration information stored in the trunk information management unit in the control apparatus according to the first exemplary embodiment of the present invention.

FIG. 6 illustrates contents of a forwarding table set in a relay apparatus having a port (a member port) that is determined to be a designated port.

FIG. 7 illustrates contents of a forwarding table set in a relay apparatus having a port (a member port) that is not determined to be a designated port.

PREFERRED MODES

Figure 1:
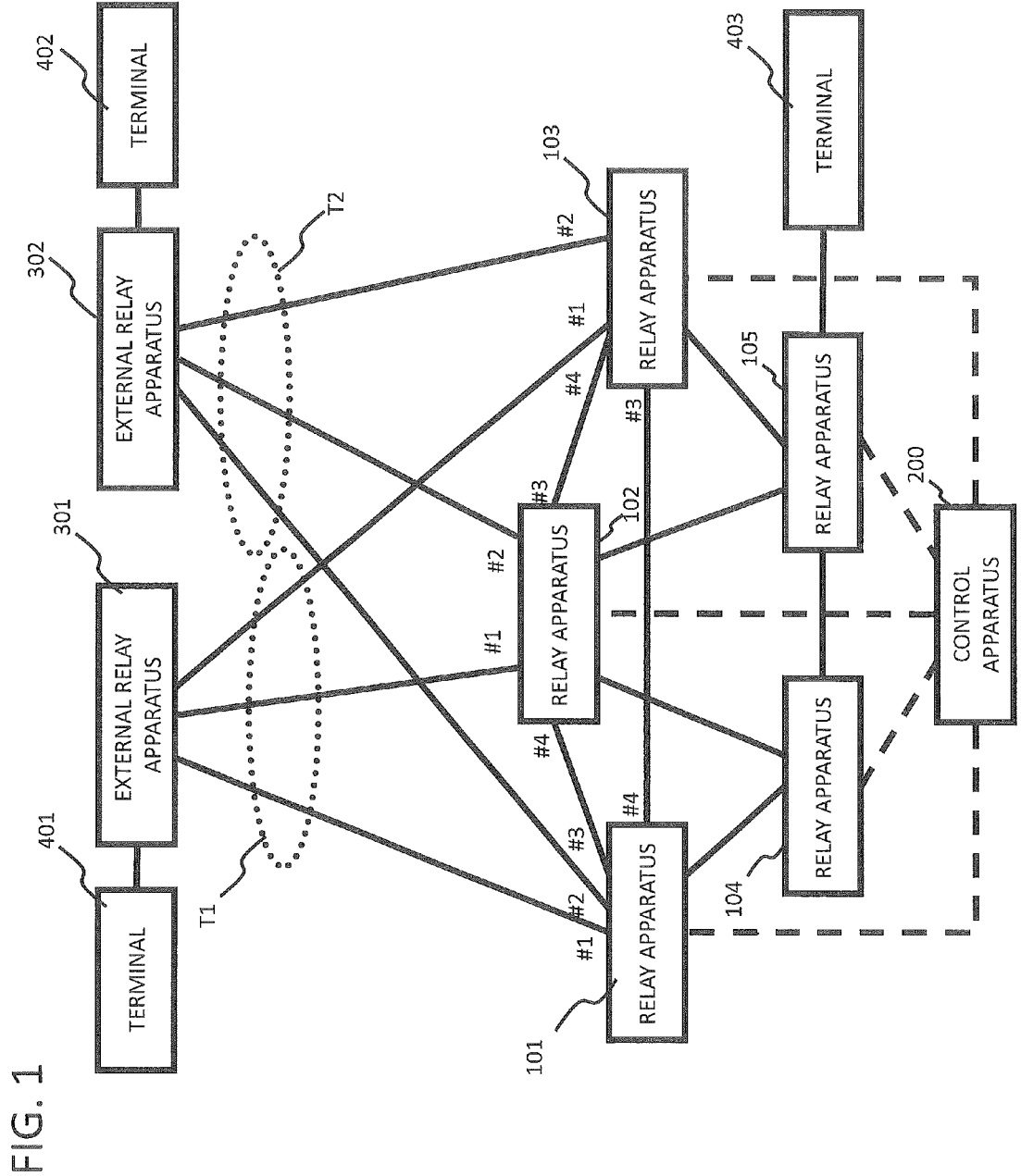
FIG. 1 illustrates a configuration according to a first exemplary embodiment of the present invention.

First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

An exemplary embodiment of the present invention can be realized by a packet forwarding system that comprises a plurality of first relay apparatuses (101 to 103 in FIG. 1) that are connected to one another and that can configure a stack link, a plurality of second relay apparatuses (301 and 302 in FIG. 1) that include a plurality of ports and are connected to the plurality of first relay apparatuses (101 to 103 in FIG. 1), and a control apparatus (200 in FIG. 1) that configures a plurality of trunks (T1 and T2 in FIG. 1) serving as virtual logical links by using a plurality of physical links between the plurality of first relay apparatuses and the plurality of second relay apparatuses. More specifically, the control apparatus (200 in FIG. 1) previously determines a designated port for each of the plurality of trunks from among constituent ports of the each trunk. When one of the plurality of first relay apparatuses (101 to 103 in FIG. 1) receives a predetermined control target packet from one of the plurality of second relay apparatuses, namely, via a link configuring a trunk, the control apparatus causes the plurality of first relay apparatuses (101 to 103 in FIG. 1) to transmit the predetermined control target packet via a relay apparatus including a designated port for one of the plurality of trunks, to which a port of the one first relay apparatus receiving the predetermined control target packet belongs (see FIGS. 8 and 9).

First Exemplary Embodiment

Next, a first exemplary embodiment of the present invention will be described in detail with reference to the drawings. FIG. 1 illustrates a configuration according to the first exemplary embodiment of the present invention. As illustrated in FIG. 1, a network includes a group of relay apparatuses 101 to 105 connected to one another, a control apparatus 200 controlling the relay apparatus group 101 to 105 in a centralized manner, and external relay apparatuses 301 and 302 outside the control of the control apparatus 200. Reference characters #1 to #4 given to each of the relay apparatuses 101 to 103 in FIG. 1 represent port numbers of the respective relay apparatuses.

Terminals 401 and 402 are connected to the external relay apparatuses 301 and 302, respectively, and can communicate with a terminal 403 connected to the relay apparatus 105.

The external relay apparatuses 301 and 302 have a function of configuring LAG (Link Aggregation) with a plurality of physical ports. In FIG. 1, two trunks T1 and T2 serving as virtual logical links are configured by aggregating physical links between the ports #1 of the relay apparatuses 101 to 103 and the external relay apparatus 301 and between the ports #2 of the relay apparatuses 101 to 103 and the external relay apparatus 302, respectively. In addition, a stack link connected in a ring is configured by using the ports #3 and #4 of the relay apparatuses 101 to 103. This stack link is used for forwarding broadcast packets in each trunk.

Figure 2:
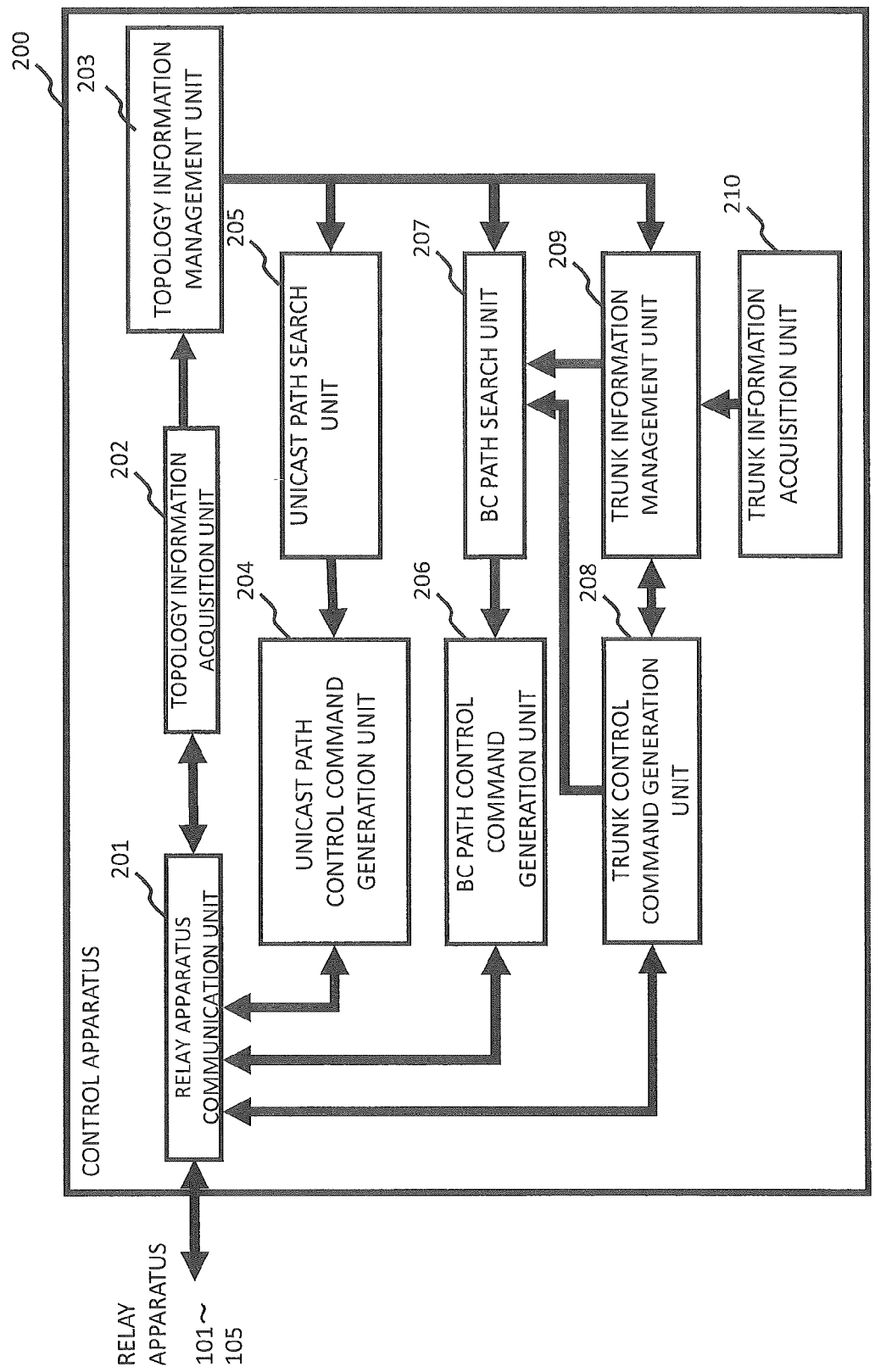
FIG. 2 is a block diagram illustrating a detailed configuration of a control apparatus according to the first exemplary embodiment of the present invention.

FIG. 2 is a block diagram illustrating a detailed configuration of the control apparatus 200 according to the first exemplary embodiment of the present invention. As illustrated in FIG. 2, the control apparatus 200 includes a relay apparatus communication unit 201, a topology information acquisition unit 202, a topology information management unit 203, a unicast path control command generation unit 204, a unicast path search unit 205, a broadcast path control command generation unit (BC path control command generation unit) 206, a broadcast path search unit (BC path search unit) 207, a trunk control command generation unit 208, a trunk information management unit 209, and a trunk information acquisition unit 210.

The relay apparatus communication unit 201 establishes control sessions with and transmits and receives control commands to and from the relay apparatuses 101 to 105 via the respective secure channels indicated by dashed lines in FIG. 1. More specifically, the relay apparatus communication unit 201 transmits control commands generated in the topology information acquisition unit 202, the unicast path control command generation unit 204, the BC path control command generation unit 206, and the trunk control command generation unit 208 to the relay apparatuses 101 to 105. In addition, the relay apparatus communication unit 201 forwards responses from the relay apparatuses 101 to 105 to the topology information acquisition unit 202, the unicast path control command generation unit 204, the BC path control command generation unit 206, and the trunk control command generation unit 208.

The topology information acquisition unit 202 communicates with the relay apparatuses 101 to 105 via the relay apparatus communication unit 201, collects topology information about a connection relationship among the relay apparatuses 101 to 105, and transmits the collected topology information to the topology information management unit 203. For collecting the topology information, an L2 protocol such as LLDP (Link Layer Discovery Protocol) for periodically detecting interface information between adjacent relay apparatuses can be used.

The topology information management unit 203 stores and manages the topology information received from the topology information acquisition unit 202 and supplies the topology information to the unicast path search unit 205, the BC path control search unit 207, and the trunk information management unit 209, as needed.

On the basis of path information supplied from the unicast path search unit 205, the unicast path control command generation unit 204 transmits a control command to each of the relay apparatuses on a path via the relay apparatus communication unit 201 and sets a packet forwarding entry (corresponding to a flow entry in Non-Patent Literature 2) in a forwarding table in each of the relay apparatuses on the path.

The unicast path search unit 205 refers to the topology information stored in the topology information management unit 203, calculates a path formed by relay apparatuses arranged between the terminals, and notifies the unicast path control command generation unit 204 of the calculated path information. The unicast path search unit 205 can calculate a single path between certain terminals. Alternatively, the unicast path search unit 205 may calculate a different path per communication. Alternatively, the unicast path search unit 205 may calculate a path by referring to, for example, a contract of a terminal user or an access policy that is acquired as a result of user authentication.

On the basis of broadcast path information supplied from the BC path search unit 207, the BC path control command generation unit 206 transmits a control command to each of the relay apparatuses on a path via the relay apparatus communication unit 201 and sets a broadcast packet forwarding entry (see FIGS. 6 and 7) in a forwarding table in each of the relay apparatuses on the path.

The BC path search unit 207 refers to the topology information stored in the topology information management unit 203, calculates a distribution tree path so that a broadcast packet can be distributed from a relay apparatus directly connected to a terminal to all the other relay apparatuses, and notifies the BC path control command generation unit 206 of the broadcast path information. If a trunk is included in the broadcast path, on the basis of a designated-port selection result received from the trunk control command generation unit 208 and stack link configuration information managed by the trunk information management unit 209, the BC path search unit 207 performs a calculation again to determine a path using the stack link so that the designated port is included in the broadcast distribution tree. Next, the BC path search unit 207 notifies the BC path control command generation unit 206 of the calculation result and requests the BC path control command generation unit 206 to set broadcast packet forwarding entries.

The trunk control command generation unit 208 performs designated-port selection processing and stack link control processing. In the designated-port selection processing, the trunk control command generation unit 208 selects a designated port from the member ports of each of a group of trunks stored in the trunk information management unit 209, notifies the BC path search unit 207 of the selected designated port, and requests for recalculation of a broadcast path. In addition, when selecting a designated port from the member ports, the trunk control command generation unit 208 may check whether each member port as a candidate can communicate with an external relay apparatus included in the target trunk by referring to the topology information management unit 203.

For example, the above designated-port selection processing is performed when new trunk configuration information is inputted from the trunk information acquisition unit 210 or when failure of a designated port is caused and change of the physical topology including the designated port is supplied from the topology information management unit 203.

In the stack link control processing, on the basis of presence or absence of a designated port of each relay apparatus and failure of a stack link port, the trunk control command generation unit 208 sets flow entries for specifying forwarding destinations of broadcast packets received from member ports and stack link ports in the relay apparatuses 101 to 103 configuring the trunks via the relay apparatus communication unit 201.

On the basis of the topology information stored in the topology information management unit 203 and the trunk information supplied from the trunk information acquisition unit 210, the trunk information management unit 209 manages the trunks on a per-group basis (trunk configuration information). In addition, the trunk information management unit 209 stores and manages a relationship of port information (EAST stack link ports and WEST stack link ports) about the stack link configured by the relay apparatuses 101 to 103 each of which has ports that configure the trunks (stack link configuration information).

The trunk information acquisition unit 210 acquires information about the trunks configured between the relay apparatuses and the external relay apparatuses and notifies the trunk information management unit 209 of the acquired information. The trunk information to be acquired is a set of information about each relay apparatus connected to the external relay apparatuses, port information (member ports), and information about a stack link configured by each of the constituent relay apparatuses. In addition, the trunk information acquisition unit 210 notifies the trunk information management unit 209 of information about each relay apparatus used for the stack link and port information as stack link configuration information. The stack link port information represents a ring-type stack link in which EAST stack link ports and WEST stack link ports are connected among the relay apparatuses.

Each unit (processing means) of the control apparatus 200 illustrated in FIG. 2 can be realized by a computer program that causes a computer constituting the control apparatus 200 to use hardware thereof and perform each processing described above.

Hereinafter, the present exemplary embodiment will be described assuming that the stack link configuration information illustrated in FIG. 3 and the trunk configuration information illustrated in FIG. 4 are set in the trunk information management unit 209. It is also assumed that the trunk information management unit 209 manages a group of trunks by adding trunk IDs "T001" and "T002" to the trunk configured between the relay apparatuses 101 to 103 and the external relay apparatus 301 and the trunk configured between the relay apparatuses 101 to 103 and the external relay apparatus 302 in FIG. 1, respectively.

In addition, in the following description, as illustrated in FIG. 4, in the trunk T1 configured between the relay apparatuses 101 to 103 and the external relay apparatus 301 in FIG. 1, the ports #1 of the relay apparatuses 101 to 103 are used as member ports. In the trunk T2 configured between the relay apparatuses 101 to 103 and the external relay apparatus 302, the ports #2 in the relay apparatuses 101 to 103 are used as member ports. In FIG. 4, two trunks of T001 and T002 share the stack link having a stack link ID=S001, which is configured by connecting the ports #3 and #4 of the relay apparatuses 101 to 103 in a ring.

In addition, as illustrated in FIG. 3, the following description assumes that the stack link port information indicates that the ports #3 of the relay apparatuses 101 to 103 are used as the EAST stack link ports and the ports #4 of the relay apparatuses 101 to 103 are used as the WEST stack link ports. It is also assumed that a ring-type link is configured by connecting the port #3 of the relay apparatus 101 with the port #4 of the relay apparatus 102, the port #3 of the relay apparatus 102 with the port #4 of the relay apparatus 103, and the port #3 of the relay apparatus 103 with the port #4 of the relay apparatus 101. In addition, such trunk information can be acquired by providing the control apparatus 200 with a dedicated UI (User Interface) for registering trunk information as the trunk information acquisition unit 210 and by allowing a user to input setting information. Alternatively, a database may be arranged in the control apparatus 200 and trunk information registered in the database may be read out.

Figure 5:
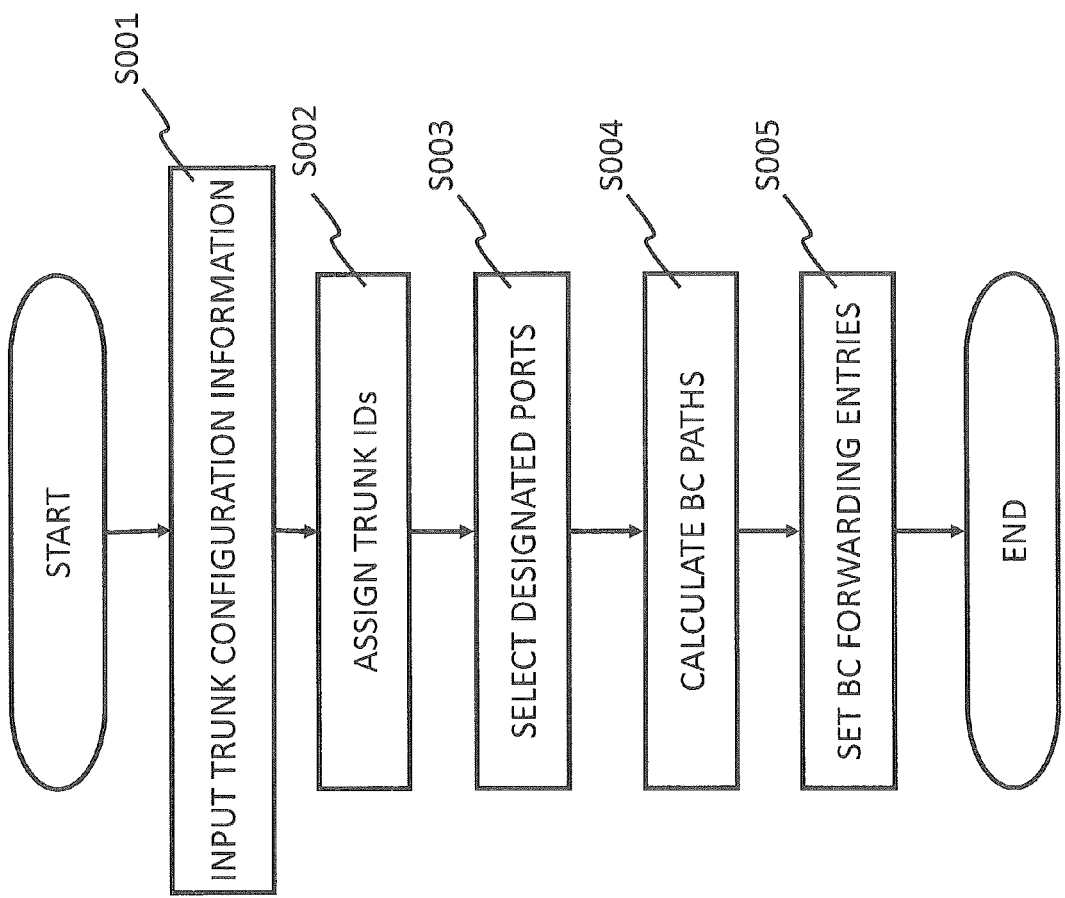
FIG. 5 is a flowchart illustrating a flow in which the control apparatus sets a broadcast forwarding entry according to the first exemplary embodiment of the present invention.

Next, an operation according to the present exemplary embodiment will be described in detail with reference to the drawings. FIG. 5 is a flowchart illustrating a flow in which the control apparatus sets a broadcast forwarding entry according to the first exemplary embodiment of the present invention. First, two trunks are configured, one trunk between the relay apparatuses 101 to 103 controlled by the control apparatus 200 and the external relay apparatus 301 outside the control of the control apparatus 200 and the other trunk between the relay apparatuses 101 to 103 controlled by the control apparatus 200 and the external relay apparatus 302 outside the control of the control apparatus 200 (step S001 in FIG. 5). When the trunk information acquisition unit 210 notifies the trunk information management unit 209 of configuration information about the trunks, the trunk information management unit 209 performs grouping per trunk and assigns a trunk ID to each of the trunks (step S002 in FIG. 5).

When the trunk information management unit 209 notifies the trunk control command generation unit 208 of trunk group information, the trunk control command generation unit 208 selects a designated port per trunk group (step S003 in FIG. 5) and notifies the BC path search unit 207 of the selection result. In this case, the trunk control command generation unit 208 selects the port #1 of the relay apparatus 101 as the designated port for the trunk having trunk ID T001 and the port #2 of the relay apparatus 103 as the designated port for the trunk having trunk ID T002.

When receiving the selection result of the designated ports, the BC path search unit 207 refers to the topology information stored in the topology information management unit 203, calculates paths using the stack link so that the designated ports are included in broadcast distribution trees, respectively, and notifies the BC path control command generation unit 206 of the calculated paths (step S004 in FIG. 5).

The BC path control command generation unit 206 generates forwarding entries for realizing broadcast packet forwarding in accordance with the paths calculated by the BC path search unit 207 and sets the forwarding entries in the relevant relay apparatuses (step S005 in FIG. 5).

FIGS. 6 and 7 illustrate contents of forwarding tables set in the relevant relay apparatuses. FIG. 6 illustrates contents of a forwarding table set in a relay apparatus that has a member port selected as a designated port (the matching conditions other than "In Port" and "MPLS (Multi-Protocol Label Switching) label" are omitted. For example, other conditions such as a broadcast address for determining a broadcast packet are set). FIG. 6 includes a forwarding entry which defines a processing content for forwarding broadcast packets received by the designated port from the port connected to the next relay apparatus on the BC forwarding path. In addition, FIG. 6 includes forwarding entries which define processing contents for forwarding broadcast packets received by the EAST stack link port and the WEST stack link port. According to these entries, if the trunk ID included in the MPLS label in a broadcast packet is the same as the trunk ID associated with the designated port of the relay apparatus receiving the broadcast packet, the relay apparatus removes (decapsulates) the MPLS label and forwards the broadcast packet from the port connected to the next relay apparatus on the BC forwarding path. In contrast, if the trunk ID included in the MPLS label is different from the trunk ID associated with the designated port of the relay apparatus, the relay apparatus forwards the broadcast packet from the stack link port opposite the stack link port that has received the broadcast packet.

FIG. 7 illustrates contents of a forwarding table set in a relay apparatus that does not have a designated port (the matching conditions other than "In Port" are omitted. For example, other conditions such as a broadcast address for determining a broadcast packet are set). FIG. 7 includes a forwarding entry which defines a processing content performed when a broadcast packet is received from a port that is not a designated port, namely, from a member port. According to this forwarding entry, the relay apparatus adds an MPLS shim header to the received broadcast packet, writes (encapsulates) a trunk ID of the trunk to which this member port belongs in the MPLS label, and forwards the received broadcast packet from the EAST stack link port. In addition, FIG. 7 includes forwarding entries which define processing contents for forwarding broadcast packets received by the EAST stack link port and the WEST stack link port. According to these forwarding entries, the relay apparatus forwards a broadcast packet from the stack link port opposite the stack link port that has received the broadcast packet.

Namely, a forwarding entry is set so that, if a designated port of a trunk receives a broadcast packet, the broadcast packet is forwarded from a port connected to the next relay apparatus (namely, the relay apparatus specified by the control apparatus 200) on a corresponding broadcast forwarding path. In contrast, a forwarding entry is set so that, if any one of the member ports of the trunk receives a broadcast packet, a stack link forwarding identifier (MPLS Label) is added and the broadcast packet is forwarded in a forward or reverse direction of the stack link until the broadcast packet is forwarded to a relay apparatus having a designated port of the trunk.

In this way, setting of the broadcast forwarding entries on the basis of input of configurations of the trunks is completed.

Next, operations performed when the ports #1 and #2 of the relay apparatus 102 constituting the trunks T1 and T2, respectively, in FIG. 1 receive a broadcast packet will be described with reference to the drawings.

First, an operation performed when the port #1 of the relay apparatus 102 receives a broadcast packet will be described with reference to FIG. 8. When the port #1 of the relay apparatus 102 receives a broadcast packet, since the relay apparatus 102 does not have a designated port, in accordance with a forwarding entry having "Member port" as a matching condition in FIG. 7, the relay apparatus 102 encapsulates the received broadcast packet with MPLS, sets "T001", which is the trunk ID of the trunk to which the port #1 of the relay apparatus 102 belongs, in the MPLS label, and forwards the broadcast packet to the port #3 of the relay apparatus 102, which is the EAST stack link port thereof.

The broadcast packet forwarded to the port #3 of the relay apparatus 102 is received by the port #4 of the relay apparatus 103, which is the WEST stack link port thereof. The relay apparatus 103 has a designated port and the port #4 of the relay apparatus 103 is the WEST stack link port as illustrated in FIG. 3. The relay apparatus 103 forwards the broadcast packet to the port #3 of the relay apparatus 103, which is the EAST stack link port thereof, in accordance with a forwarding entry in FIG. 6 that has "WEST stack link port" as a matching condition and that indicates, as a matching condition, that the trunk ID (=T002) of the trunk, to which the port #2 serving as the designated port of the relay apparatus 103 belongs, is different from that included in the MPLS label in the packet being forwarded.

The packet forwarded to the port #3 of the relay apparatus 103 is received by the port #4 of the relay apparatus 101, which is the WEST stack link port thereof. The relay apparatus 101 has a designated port and the port #4 of the relay apparatus 101 is the WEST stack link port as illustrated in FIG. 3. Thus, the relay apparatus 101 removes the MPLS label (performs decapsulating) and forwards the broadcast packet to a port connected to the next relay apparatus (the relay apparatus 104) on a corresponding broadcast forwarding path, in accordance with a forwarding entry in FIG. 6 that has "WEST stack link port" as a matching condition and that indicates, as a matching condition, that the trunk ID (=T001) of the trunk, to which the port #1 serving as the designated port of the relay apparatus 101 belongs, is the same as that included in the MPLS label in the packet being forwarded.

Figure 8:
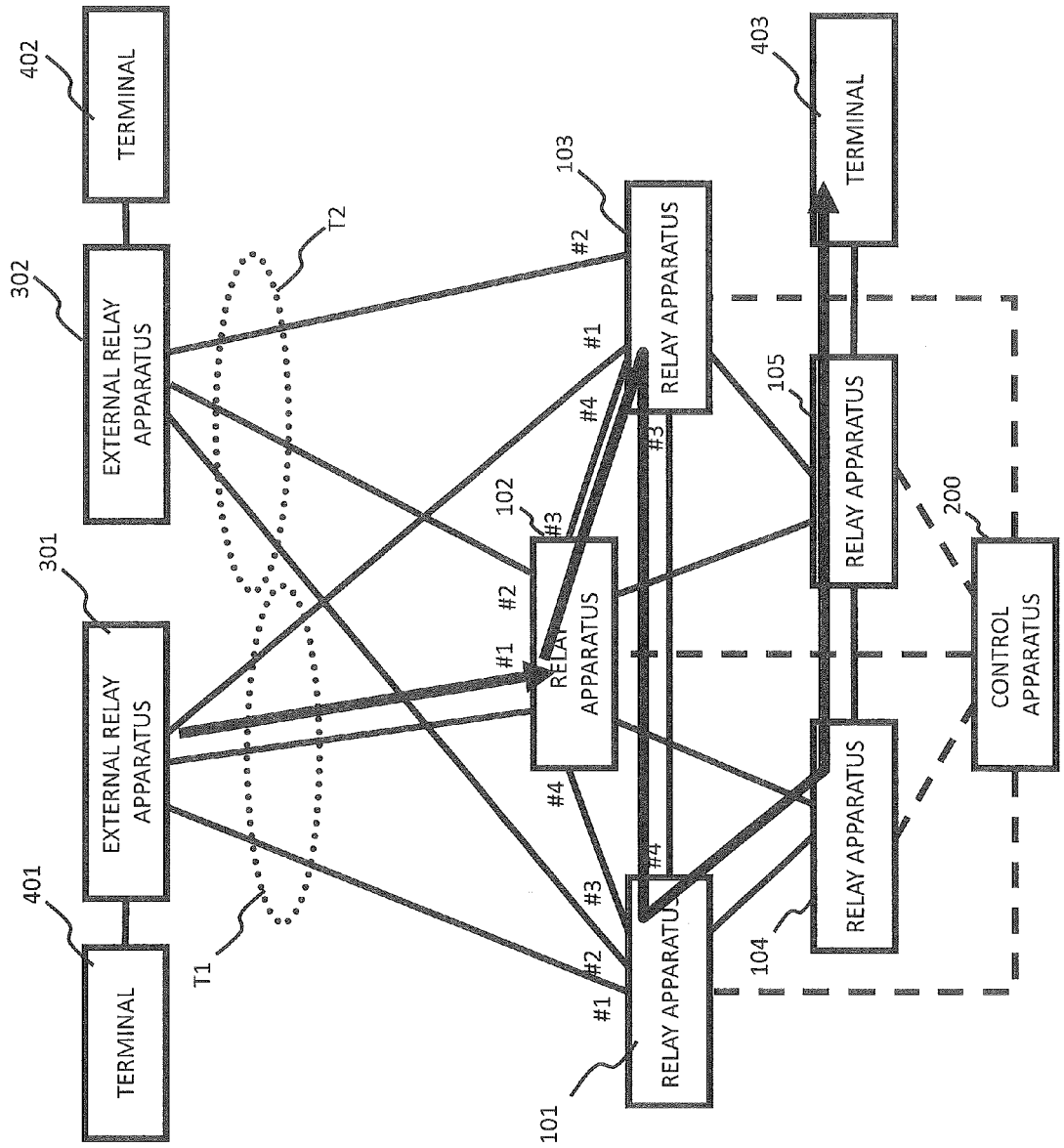
FIG. 8 illustrates a broadcast packet forwarding path.

Since a forwarding entry for performing forwarding in accordance with a broadcast packet forwarding path is previously set in each of the relay apparatuses 104 and 105 by the BC path control command generation unit 206, the broadcast packet is forwarded on the path indicated by an arrow in FIG. 8.

Next, an operation performed when the port #2 of the relay apparatus 102 receives a broadcast packet will be described with reference to FIG. 9. When the port #2 of the relay apparatus 102 receives a broadcast packet, since the relay apparatus 102 does not have a designated port, in accordance with a forwarding entry in FIG. 7 having "Member port" as a matching condition, the relay apparatus 102 encapsulates the received broadcast packet with MPLS, sets "T002", which is the trunk ID of the trunk to which the port #2 of the relay apparatus 102 belongs, in the MPLS label, and forwards the broadcast packet to the port #3, which is the EAST stack link port of the relay apparatus 102.

The broadcast packet forwarded to the port #3 of the relay apparatus 102 is received by the port #4 of the relay apparatus 103, which is the WEST stack link port thereof. The relay apparatus 103 has a designated port and the port #4 of the relay apparatus 103 is the WEST stack link port thereof as illustrated in FIG. 3. Thus, the relay apparatus 103 removes the MPLS label (performs decapsulating) and forwards the broadcast packet to a port connected to the next relay apparatus (the relay apparatus 105) on a corresponding broadcast forwarding path, in accordance with a forwarding entry in FIG. 6 that has "WEST stack link port" as a matching condition and that indicates, as a matching condition, that the trunk ID (=T002) of the trunk, to which the port #2 serving as the designated port of the relay apparatus 103 belongs, is the same as that included in the MPLS label in the packet being forwarded.

Figure 9:
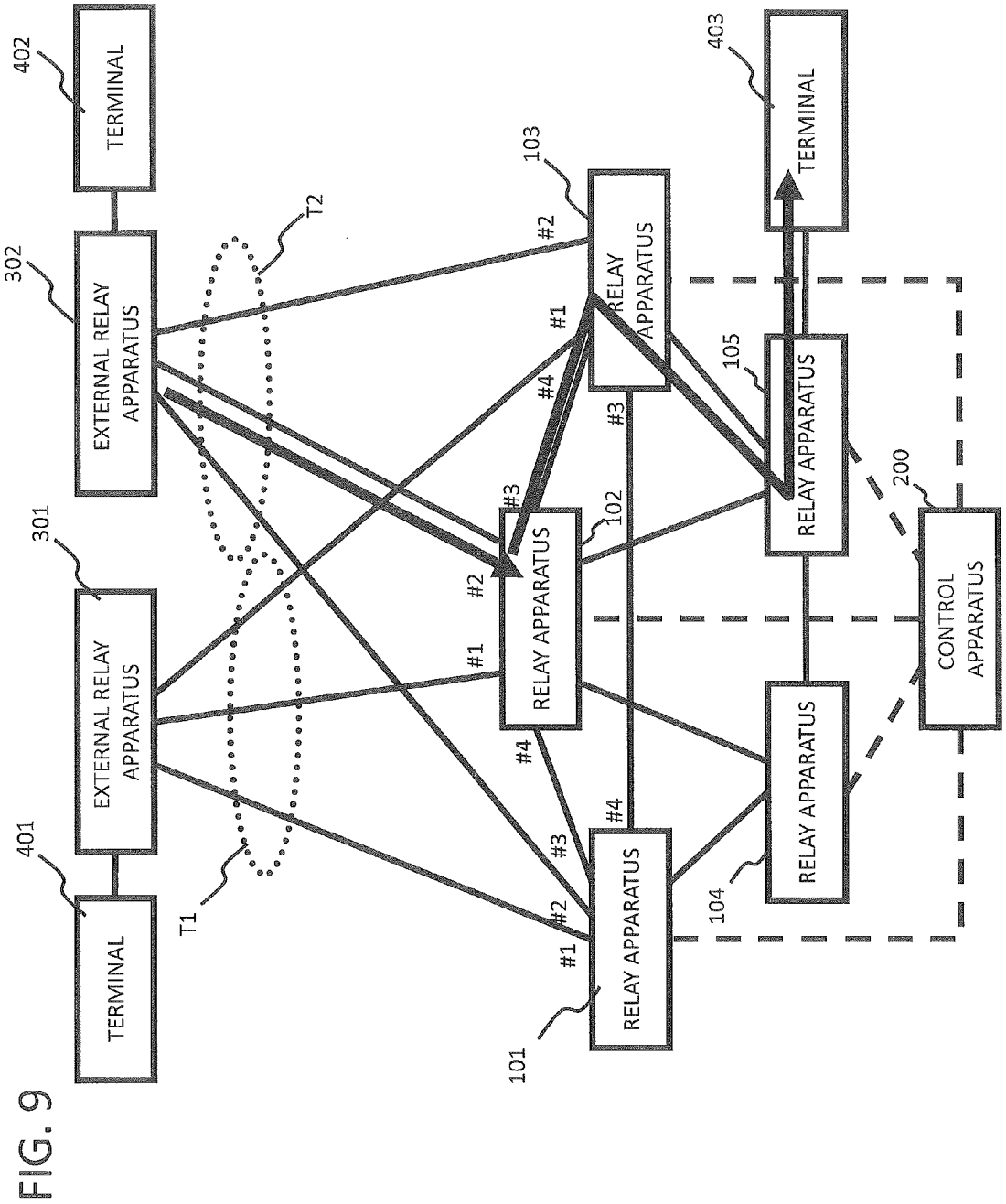
FIG. 9 illustrates a broadcast packet forwarding path.

Since a forwarding entry for performing forwarding in accordance with the broadcast packet forwarding path is previously set in the relay apparatus 105 by the BC path control command generation unit 206, the broadcast packet is forwarded on the path indicated by an arrow in FIG. 9.

Figure 12:
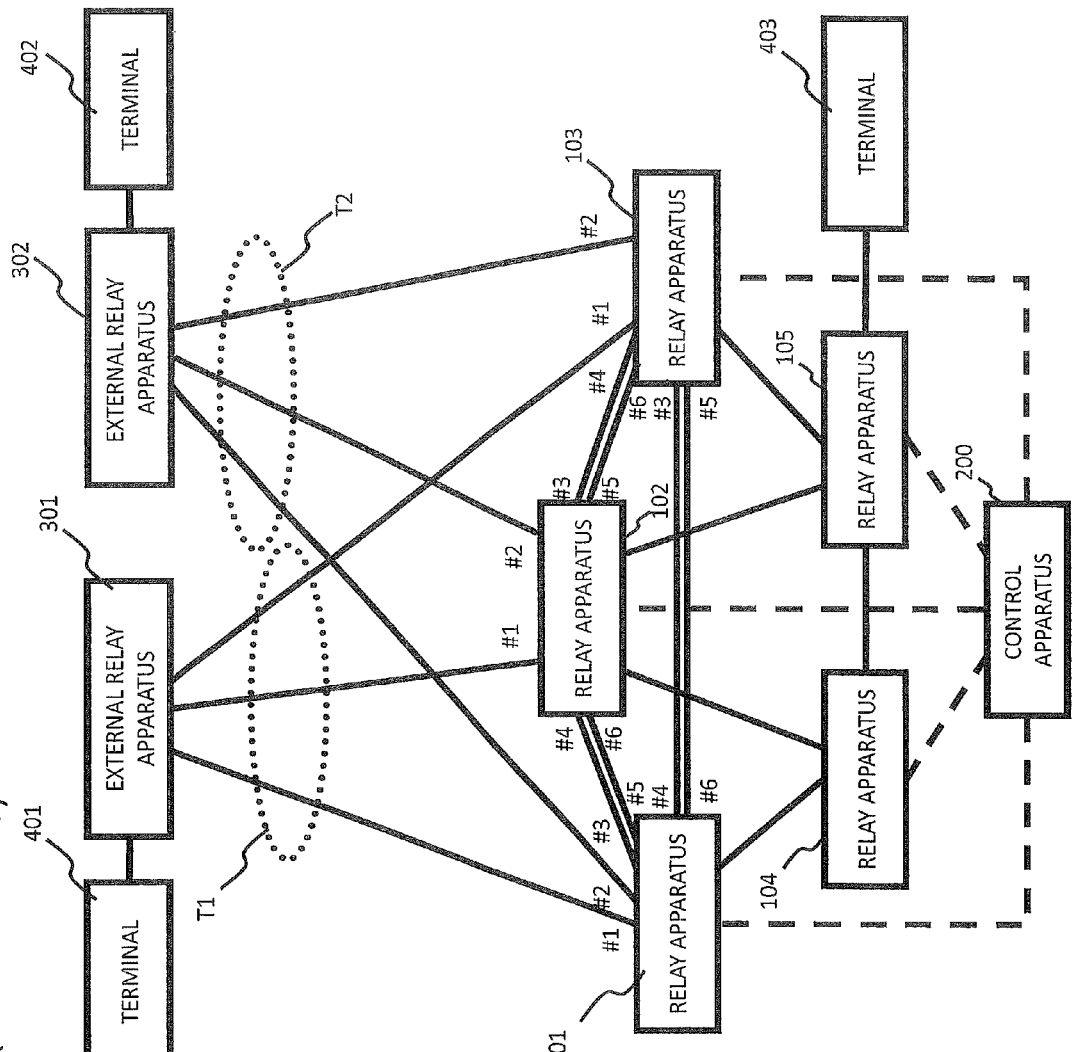
FIG. 12 illustrates a configuration obtained by adding a trunk to the configuration illustrated in FIG. 11.

As described above, if the ports #3 and #4 of the relay apparatuses 101 to 103 configure a stack link in a ring and if a member port (the port #1 or #2) of the relay apparatus 102 receives a broadcast packet, the broadcast packet is forwarded in accordance with the forwarding entries for determining the trunk of the broadcast packet by using the trunk ID as a matching condition. Unlike the reference example illustrated in FIG. 12, a plurality of trunks (the trunks T1 and T2) can share a stack link. As a result, broadcast packet forwarding can be realized without increasing the number of necessary physical ports of the relay apparatuses 101 to 103 that configure the stack link.

The above exemplary embodiment has been described on the basis of examples in which the two trunks T1 and T2 are arranged. However, as is understood from the above description and the forwarding entries illustrated in FIGS. 6 and 7, packet forwarding can be performed by sharing the stack link even if three or more trunks are configured.

In addition, a single stack link is shared in the above exemplary embodiment. However, the present invention may adopt a configuration for performing packet forwarding by sharing two or more stack links. In such case, an entry having a different stack link ID is added to the stack link configuration information and an entry having the stack link ID associated with a corresponding trunk ID is set in the trunk configuration information in FIG. 4. In addition, the BC path control command generation unit 206 of the control apparatus 200 refers to the stack link configuration information and the trunk configuration information and sets at least one forwarding entry including at least one matching condition for determining broadcast packets to be forwarded to the second stack link.

Figure 10:
FIG. 10 illustrates a configuration of a flow entry in Non-Patent Literature 2.
Figure 11:
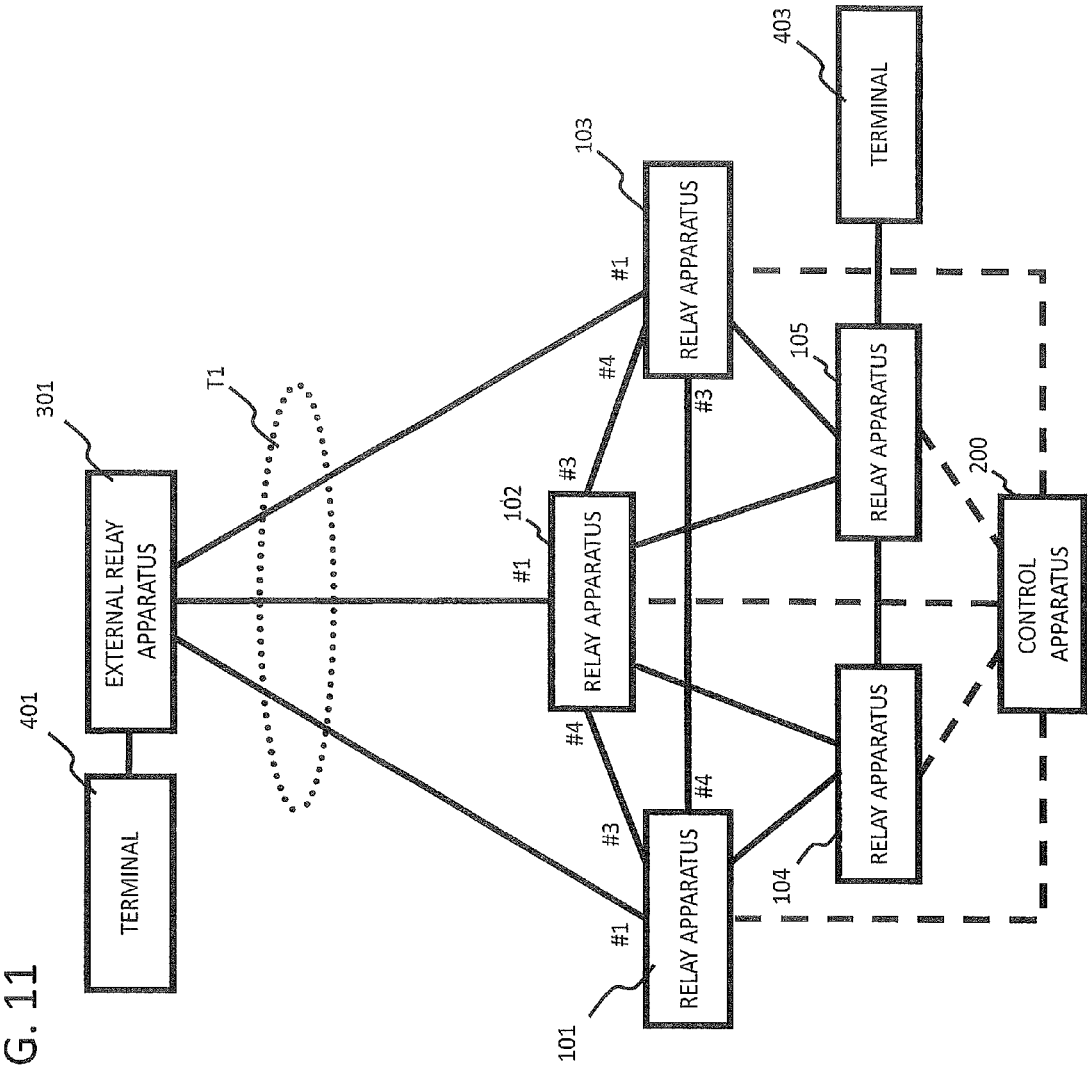
FIG. 11 illustrates a configuration of a packet forwarding system as a reference example.

In addition, in the above exemplary embodiment, an MPLS shim header for determining a trunk ID corresponding to a broadcast packet being forwarded through the stack link is added and the trunk ID is written in the MPLS label. However, a header in different format may be added. Alternatively, instead of adding a header, a trunk ID may be embedded in an existing field that can be used as a matching condition illustrated in FIG. 10.

In addition, the above exemplary embodiment has been described on the basis of examples in which broadcast packet forwarding control is performed. However, packets other than broadcast packets can be used as control target packets. For example, the present invention is applicable to forwarding multicast packets that are forwarded from an external relay apparatus.

In addition, in the above exemplary embodiment, the relay apparatuses 101 to 103 are connected in a ring. However, a different network configuration is also applicable, as long as packets can be forwarded to a designated port.

The disclosure of each of the above Patent Literatures and Non-Patent Literatures is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept.

101 to 105 relay apparatus
200 control apparatus
201 relay apparatus communication unit
202 topology information acquisition unit
203 topology information management unit
204 unicast path control command generation unit
205 unicast path search unit 206 broadcast path control command generation unit (BC path control command generation unit)
207 broadcast path search unit (BC path search unit)
208 trunk control command generation unit
209 trunk information management unit
210 trunk information acquisition unit
301, 302 external relay apparatus
401 to 403 terminal

What is claimed is:

1. A packet forwarding system, comprising:
a control apparatus comprising a computer;
a plurality of first relay apparatuses that are connected to one another and that are centrally controlled objects by the control apparatus; and
a plurality of second relay apparatuses that include a plurality of ports and that are not centrally controlled objects and are connected to the plurality of first relay apparatuses, wherein:
the control apparatus including the computer configures a plurality of trunks, each serving as a virtual logical link, by using a plurality of physical links between the first relay apparatuses and the second relay apparatuses,
the control apparatus including the computer determines a designated port for each of the plurality of trunks from among constituent ports of the each trunk, and
when one of the plurality of first relay apparatuses receives a predetermined control target packet from one of the plurality of second relay apparatuses, the control apparatus causes the plurality of first relay apparatuses to transmit the predetermined control target packet via a first relay apparatus including a designated port for one of the plurality of trunks, to which a port of the one first relay apparatus receiving the predetermined control target packet belongs,
wherein the plurality of first relay apparatuses are connected through a ring-shaped link,
if one of the plurality of first relay apparatuses receives the predetermined control target packet via a port other than a designated port for one of the plurality of trunks, the control apparatus causes the one first relay apparatus to add a trunk ID to the predetermined control target packet and forward the predetermined control target packet having the trunk ID in a forward or reverse direction of the ring-shaped link,
the control apparatus including the computer causes the predetermined control target packet having the trunk ID to reach a first relay apparatus including a designated port for a trunk corresponding to the trunk ID by forwarding the predetermined control target packet in the forward or reverse direction of the ring-shaped link, and
the control apparatus including the computer causes a first relay apparatus that includes the designated port of the trunk corresponding to the trunk ID to remove the trunk ID from the predetermined control target packet and forward the predetermined control target packet to a specified apparatus.

2. The packet forwarding system according to claim 1, wherein
the plurality of first relay apparatuses forward the predetermined control target packet among the plurality of first relay apparatuses based on a trunk ID (identifier) added to the predetermined control target packet for identifying one of the plurality of trunks.

3. The packet forwarding system according to claim 2, wherein
the trunk ID is stored as an MPLS (Multi-Protocol Label Switching) label.

4. The packet forwarding system according to claim 2, wherein
the plurality of first relay apparatus are connected through a ring-shaped link,
if one of the plurality of first relay apparatus received the predetermined control target packet via a port other than a designated port for one of the plurality of trunks, the control apparatus causes the one first relay apparatus to add a trunk ID to the predetermined control target packet and forward the predetermined control target packet having the trunk ID in a forward or reverse of the ring-shaped link,
the control apparatus including the computer causes the predetermined control target packet having the trunk ID to reach a first relay apparatus including a designated port for a trunk corresponding to the trunk ID by forwarding the predetermined control target packet in the forward or reverse direction of the ring-shaped link, and
the control apparatus including the computer causes a first relay apparatus that includes the designated port of the trunk corresponding to the trunk ID to remove the trunk ID from the predetermined control target and forward the predetermined control target packet to a specified apparatus.

5. The packet forwarding system according to claim 4, wherein
the trunk ID is stored as an MPLS (Multi-Protocol Label Switching) label.

6. The packet forwarding system according to claim 1, wherein
the trunk ID is stored as an MPLS (Multi-Protocol Label Switching) label.

7. The packet forwarding system according to claim 1, wherein the control apparatus includes the computer that comprises a processor, and a non-transitory computer-readable recording medium that stores a program that is executed by the processor, and
wherein the plurality of first relay apparatuses are controlled by the control apparatus, and the plurality of second relay apparatuses are not controlled by the control apparatus.

8. A control apparatus comprising:
a computer, the control apparatus including the computer configuring a plurality of trunks, each serving as a virtual logical link, by using a plurality of physical links between a plurality of first relay apparatuses connected to one another and that are centrally controlled objects by the control apparatus, and a plurality of second relay apparatuses that include a plurality of ports and that are not centrally controlled objects and are connected to the plurality of first relay apparatuses,
wherein the control apparatus including the computer determines a designated port for each of the plurality of trunks from among constituent ports of the each trunk, and
when one of the plurality of first relay apparatuses receives a predetermined control target packet from one of the plurality of second relay apparatuses, the control apparatus including the computer causes the plurality of first relay apparatuses to transmit the predetermined control target packet via a first relay apparatus including a designated port for one of the plurality of trunks, to which a port of the one first relay apparatus receiving the control target packet belongs, wherein the plurality of first relay apparatuses are connected through a ring-shaped link, wherein if one of the plurality of first relay apparatuses receives the predetermined control target packet via a port other than a designated port for one of the plurality of trunks, the control apparatus causes the one first relay apparatus to add a trunk ID to the predetermined control target packet and forward the predetermined control target packet having the trunk ID in a forward or reverse direction of the ring-shaped link, wherein the control apparatus including the computer causes the predetermined control target packet having the trunk ID to reach a first relay apparatus including a designated port for a trunk corresponding to the trunk ID by forwarding the predetermined control target packet in the forward or reverse direction of the ring-shaped link, and wherein the control apparatus including the computer causes a first relay apparatus that includes the designated port of the trunk corresponding to the trunk ID to remove the trunk ID from the predetermined control target packet and forward the predetermined control target packet to a specified apparatus.

9. The control apparatus according to claim 8, wherein the control apparatus including the computer causes the plurality of first relay apparatuses to add a trunk ID (identifier) to the predetermined control target packet for determining one of the plurality of trunks and perform forwarding of the predetermined control target packet based on the added trunk ID.

10. The control apparatus according to claim 9, wherein the control apparatus including the computer causes the plurality of first relay apparatuses to add an MPLS (Multi-Protocol Label Switching) header and store the trunk ID as an MPLS label.

11. The control apparatus according to claim 9, wherein the plurality of first relay apparatus are connected through a ring-shaped link, if one of the plurality of first relay apparatus received the predetermined control target packet via a port other than a designated port for one of the plurality of trunks, the control apparatus causes the one first relay apparatus to add a trunk ID to the predetermined control target packet and forward the predetermined control target packet having the trunk ID in a forward or reverse direction of the ring-shaped link, the control apparatus including the computer causes the predetermined control target packet having the trunk ID to reach a first relay apparatus including a designated port for a trunk corresponding to the trunk ID by forwarding the predetermined control target packet in the forward or reverse direction of the ring-shaped link, and the control apparatus including the computer causes a first relay apparatus that includes the designated port of the trunk corresponding to the trunk ID to remove the trunk ID from the predetermined control target packet and forward the predetermined control target packet to a specified apparatus.

12. The control apparatus according to claim 11, wherein the control apparatus including the computer causes the plurality of first relay apparatus to add an MPLS (Multi-Protocol Label Switching) header and store the trunk ID as an MPLS label.

13. The control apparatus according to claim 8, wherein the control apparatus including the computer causes the plurality of first relay apparatus to add an MPLS (Multi-Protocol Label Switching) header and store the trunk ID as an MPLS label.

14. The control apparatus according to claim 8, wherein the computer comprises a processor, and a non-transitory computer-readable recording medium that stores a program that is executed by the processor, and wherein the plurality of first relay apparatuses are controlled by the control apparatus, and the plurality of second relay apparatuses are not controlled by the control apparatus.

* * * * *